(12) United States Patent
Tamatani

(10) Patent No.: US 6,313,890 B1
(45) Date of Patent: Nov. 6, 2001

(54) LIQUID CRYSTAL DISPLAY DEVICE

(75) Inventor: Akira Tamatani, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/614,733

(22) Filed: Jul. 12, 2000

(30) Foreign Application Priority Data

Jul. 16, 1999  (JP) .................................................. 11-203749

(51) Int. Cl.[7] ........................................................ G02F 1/133

(52) U.S. Cl. ................................................................. 349/61

(58) Field of Search .......................................... 349/65, 61

(56) References Cited

U.S. PATENT DOCUMENTS 5,694,186 * 12/1997 Yanagawa et al. .................. 349/106
6,239,851 * 5/2001 Hatazawa et al. ..................... 349/62

* cited by examiner

Primary Examiner—James A. Dudek
(74) Attorney, Agent, or Firm—Oblon, Spivak, McClelland, Maier & Neustadt, P.C.

(57) ABSTRACT

The present invention is directed to a liquid crystal display including: an active matrix liquid crystal display element; and a surface light source; the liquid crystal display element including a liquid crystal substance sandwiched between an electrode substrate and an counter substrate via alignment films; the electrode substrate having a surface formed with a matrix of pixel portion having switching elements surrounded by a plurality of image signal lines and scanning signal lines; wherein a transmittance distribution of the liquid crystal display element reduces a brightness distribution inconsistency in the surface light source; or more specifically; wherein Xmax is a maximum brightness value in a display region of the surface light source, Xmin is a minimum brightness value thereof, Zmax is a maximum brightness value of the liquid crystal display, and Zmin is a minimum brightness value thereof; and wherein the expression of Xmax/Xmin>Zmax/Zmin is satisfied.

14 Claims, 12 Drawing Sheets

A: 1.60~1.80
B: 1.40~1.60
C: 1.20~1.40
D: 1.00~1.20

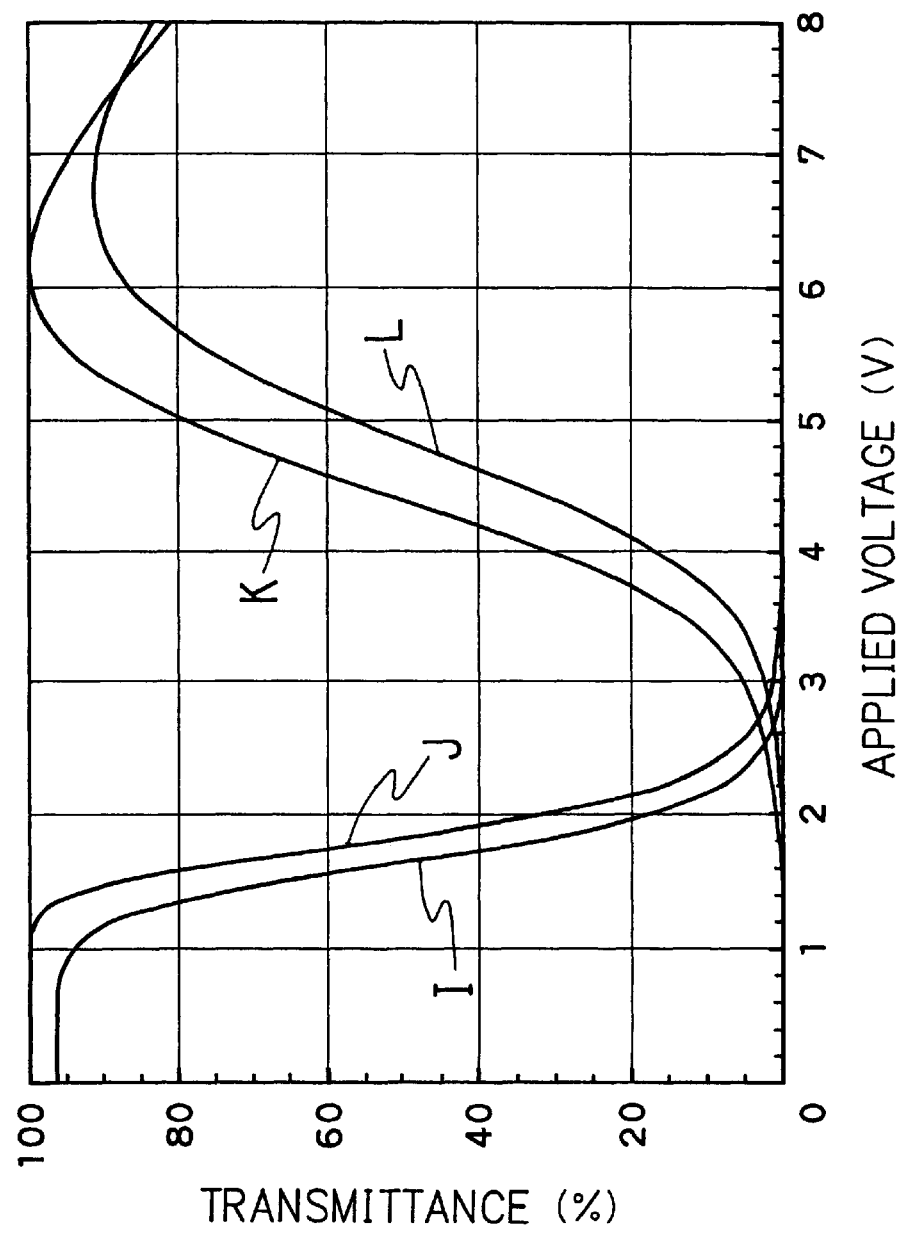

LIQUID CRYSTAL DISPLAY DEVICE

BACKGROUND OF THE INVENTION

The present invention relates to a liquid crystal display, and more particularly to a liquid crystal display having a reduced brightness distribution inconsistency in a surface light source, and an improved display characteristic.

A liquid crystal display has such features as being thin, light-weighted and power-saving, and therefore is used widely as a display for a wrist watch, calculator and so on. Especially, an active driving display driven by thin-film transistors (TFT) is replacing a CRT which has been a major display for a word processor, personal computer and so on.

The liquid crystal display can be configured in various display modes such as twisted nematic (TN) mode, vertical orientation mode, and in-plane switching (IPS) mode. Recently, the vertical orientation mode and the in-plane switching mode attract attention for their wideness of view angle.

The liquid crystal display comprises a liquid crystal display element which, controlled by electric signals for example, passes or blocks light, and a surface light source for example.

As is written in page 117 to page 123 of the "Liquid Crystal Parts and Materials Business Frontier", a publication by the Industrial Research Association, the surface light source has two types, namely direct type and guide board type. In the guide board type, a board type surface light source has an edge mounted lamp, and the light is provided through the guide board. With this arrangement, a portion closer to the lamp has a higher brightness, and so in actual application, a mask for example is used in order to reduce (uniformalize) brightness distribution.

In the direct type, brightness is high in right above the lamp, so the mask is provided over the lamp to directly shade the light from the lamp, thereby providing brightness distribution control. Further, other improvements are incorporated in these surface light sources, including provision of an optical film such as a light-diffusing sheet, and optimization in optical design.

However, use of the light diffusing sheet and the like adds manufacturing cost, and therefore the number of sheets for controlling the brightness distribution is often decreased. Currently, there is still approximately 10 to 30% of inconsistency in an in-plane brightness distribution.

FIG. 12 shows a construction of the liquid crystal display. In this figure, a member indicated by numeral 1 is a surface light source (sectional view), a member indicated by numeral 2 is outgoing light from the surface light source, a member indicated by numeral 3 is a liquid crystal display element (liquid crystal cell, sectional view) passing or blocking light depending on electric voltage, and a member indicated by numeral 4 is outgoing light from the liquid crystal display. FIG. 13(a) is a relative brightness distribution in the liquid crystal display from its left end (X) to right end (Y) along a horizontal scanning line, FIG. 13(b) shows a relative transmittance distribution of the liquid crystal display, and FIG. 13(c) shows a relative brightness distribution of the surface light source.

The brightness of the liquid crystal display is expressed as "surface light source illuminance×transmittance of the liquid crystal display element". Therefore, if the surface light source having the brightness distribution as shown in FIG. 13(c) is used with the liquid crystal display element having a uniform relative transmittance distribution as shown in FIG. 13(b), the brightness distribution of the surface light source is directly reflected in the display screen, resulting in such problems that display is not made uniformly, gradation is not displayed as designed, and good display characteristics are not achieved. Although the use of the light diffusing sheets for example reduces inconsistency in the in-plane brightness distribution of the surface light source, a large number of the sheets are necessary if the brightness distribution is to be totally uniformalized, resulting in high manufacturing cost. For these reasons, it has been difficult to provide a liquid crystal display having a small in-plane brightness distribution inconsistency manufactured at a low cost, only by improving the in-plane brightness distribution of the surface light source.

An object of the present invention is to offset the brightness distribution inconsistency of the surface light source by controlling the in-plane transmittance distribution of the liquid crystal display element, thereby obtain a liquid crystal display manufactured at a low cost and high in display performance in which the in-plane brightness distribution is improved to be superior to the surface light source brightness distribution.

SUMMARY OF THE INVENTION

The present invention is directed to a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal lines, wherein a transmittance distribution of the liquid crystal display element reduces a brightness distribution inconsistency in the surface light source; or more specifically, with Xmax being a maximum brightness value in a display region of the surface light source, Xmin being a minimum brightness value thereof, Zmax being a maximum brightness value of the liquid crystal display, and Zmin being a minimum brightness value thereof, the following expression is satisfied:

$$X\mathrm{max}/X\mathrm{min} > Z\mathrm{max}/Z\mathrm{min}$$

Further, the liquid crystal display according to the present invention is a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal lines, wherein with Xmax being a maximum brightness value in a display region of the surface light source, Xmin being a minimum brightness value thereof, Zmax being a maximum brightness value of the liquid crystal display, and Zmin being a minimum brightness value thereof, the following expression is satisfied:

$$X\mathrm{max}/X\mathrm{min} - Z\mathrm{max}/Z\mathrm{min} > 0.1$$

Further, the liquid crystal display according to the present invention is a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal lines, wherein with Δd being a difference between a maximum value and minimum value of a liquid crystal layer thickness, the expression 0.05 μm≦Δd≦1.0 μm is satisfied.

Further, the liquid crystal display according to the present invention is a liquid crystal display in which an orientation direction of the liquid crystal near the electrode substrate differs by 90 degrees from an orientation direction of the liquid crystal near the counter substrate, the electrode substrate and the counter substrate being placed between two polarizers, the polarizers on the electrode-substrate side and the counter substrate side having an absorption axis in a direction equal to or differing by 90 degrees from the orienting direction of the liquid crystal, wherein with d1 being the liquid crystal thickness corresponding to a region of the highest brightness in the surface light source, d2 being the liquid crystal thickness in a region of the lowest brightness thereof, Δn being a refraction anisotropy of the liquid crystal, and λ being a wavelength, the following expression is satisfied:

$$d1 < d2$$

$$d2 < (3)^{1/2} \lambda / (2\Delta n)$$

Further, the liquid crystal display element has a comb-like electrode, wherein with d1 being the liquid crystal thickness corresponding to a region of the highest brightness in the surface light source, d2 being the liquid crystal thickness in a region of the lowest brightness thereof, a maximum electric voltage applied to the liquid crystal layer is lower than an electric voltage for achieving a maximum transmittance when the liquid crystal thickness is d2, and the expression d1<d2 is satisfied.

Further, the brightness value at a center portion of the surface light source is highest, with the brightness value decreasing toward a perimeter region.

Further, the liquid crystal display according to the present invention is a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal line, wherein the transmittance distribution of the liquid crystal display element is determined by the transmittance of the counter substrate.

Further, the transmittance of the counter substrate is determined by an opening rate of the counter substrate, namely, by a rate of light-transparent region.

Further, the counter substrate has a surface formed with a color layer for color display, the transmittance of the counter substrate being determined by the color layer.

Further, the counter substrate has a surface formed with a color layer for color display, the transmittance of the color layer being controlled by mixing non-transparent particles such as carbon particles to the color layer.

Further, the liquid crystal display according to the present invention is a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal line, wherein the liquid crystal display element has a transmittance distribution determined by an opening ratio of the electrode substrate, namely, by the ratio of light-transparent region.

Further, the liquid crystal display according to the present invention is a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal line, wherein a layer controlling the transmittance is provided on a viewer's side or on a side away therefrom, for controlling the transmittance of the liquid crystal display element.

Further, the electrode substrate has an electrode structure for generation of an electric field approximately in parallel to the substrates.

Further, the liquid crystal display according to the present invention is a liquid crystal display comprising an active matrix liquid crystal display element and a surface light source, the liquid crystal display element including a liquid crystal substance sandwiched between an electrode substrate and an counter substrate via alignment films, the electrode substrate having a surface formed with a matrix of pixel portion having switching elements surrounded by a plurality of image signal lines and scanning signal line, the electrode having a comb-like structure, the electric field approximately parallel to the substrates being generated for in-plane drive of the liquid crystal molecules, wherein with L1 being an inter-electrode gap of the comb-like electrode corresponding to a region of the highest brightness of the surface light source, and L2 being an inter-electrode gap of the comb-like electrode corresponding to a region of the lowest brightness thereof, the expression L1>L2 is satisfied.

BRIEF DESCRIPTION OF THE DRAWINGS

FIG. 14 is a graph showing a dependency on the applied voltage of the transmittance of the liquid crystal display device.

DETAILED DESCRIPTION

Function of the present invention will be described by using the following example.

Figure 1:
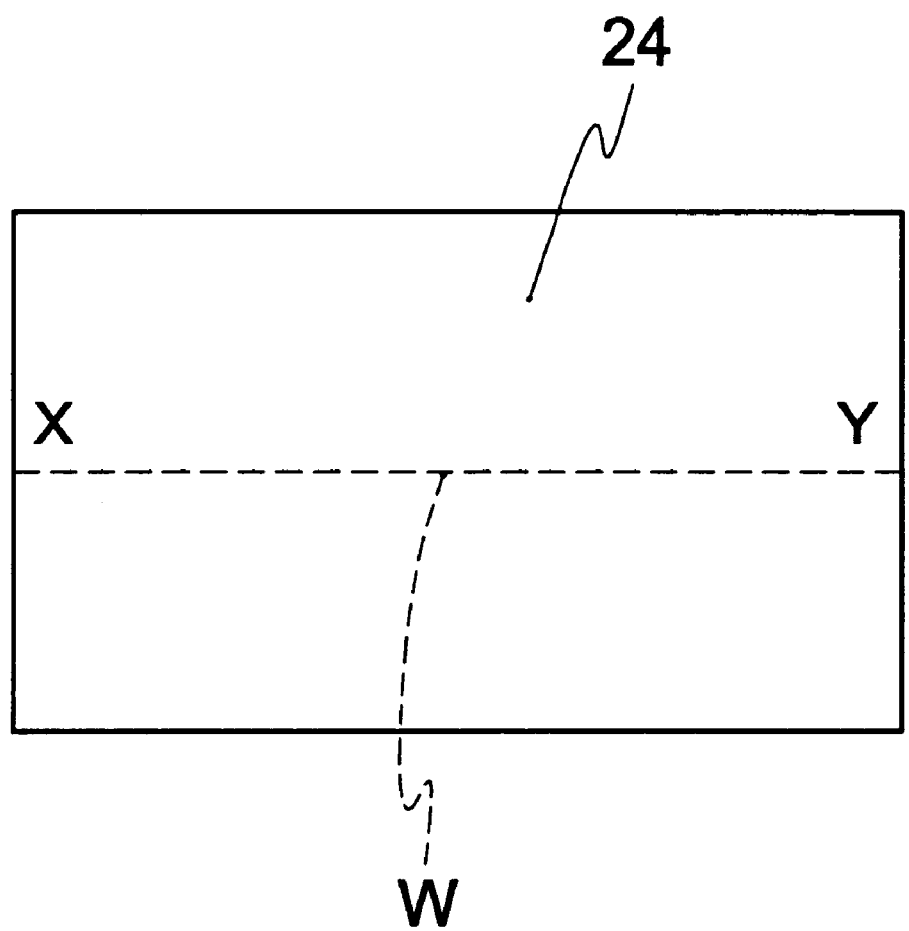
FIG. 1 is a front view of the display screen of the liquid crystal display device.
Figure 2A:
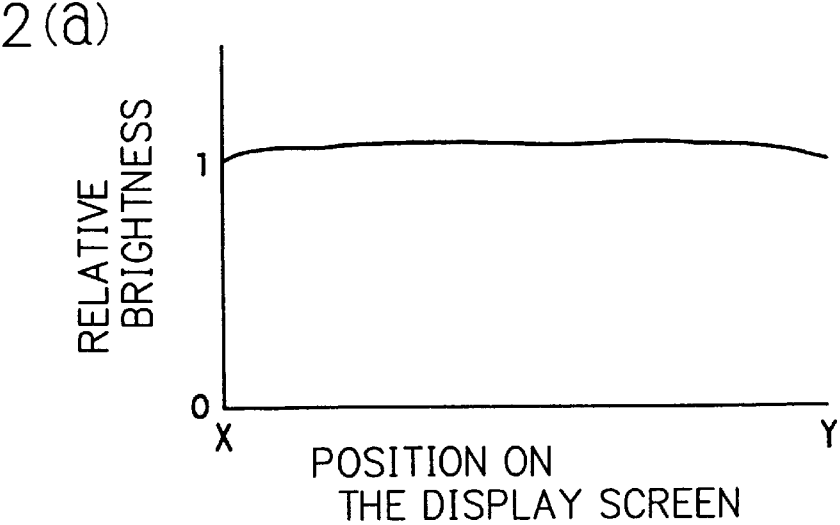
FIGS. 2(a) to 2(c) are graphs showings a relative brightness to the position on a display screen, a relative transmittance to the position on the display screen and a relative brightness to the position on the display screen.
Figure 2B:
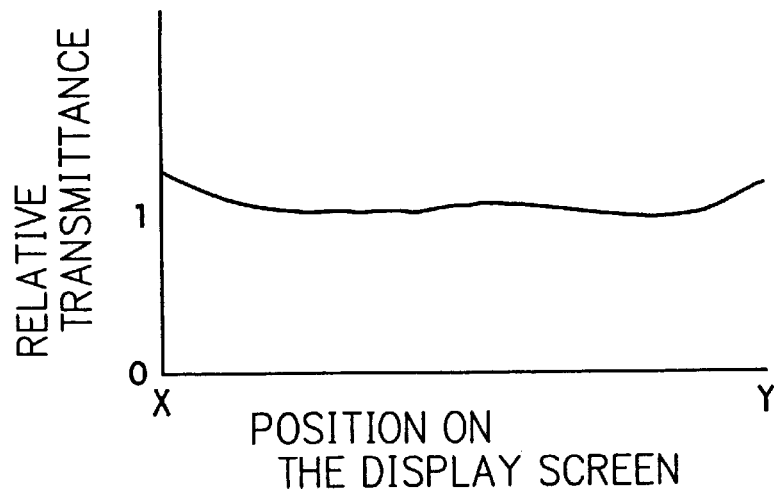
Figure 2C:
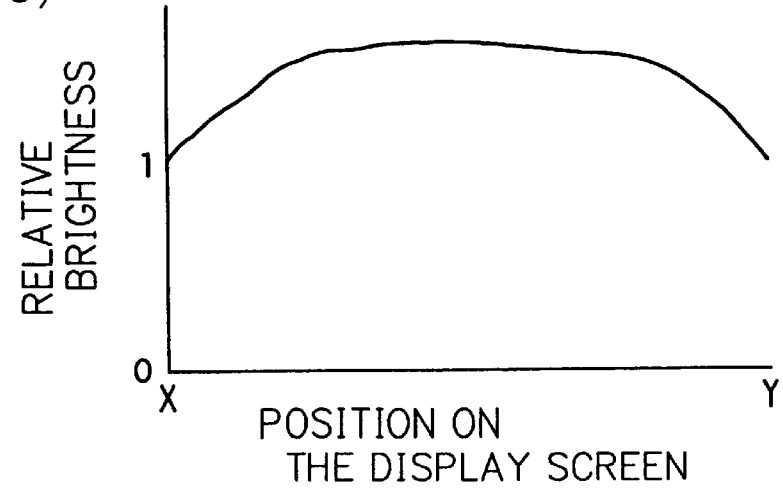

FIG. 1 shows a front view of a display screen 24 of a liquid crystal display, FIG. 2(a) shows a relative brightness distribution in the liquid crystal display along a broken line W between X and Y shown in FIG. 1 in the liquid crystal display. FIG. 2(b) shows a relative transmittance distribution of the liquid crystal display element (liquid crystal cell). FIG. 2(c) shows a relative brightness distribution of the surface light source.

As shown in FIGS. 1 and 2, by controlling the transmittance distribution of the liquid crystal display element so as to offset (cancel) the brightness distribution inconsistency in the surface light source, a liquid crystal display having a high display quality can be obtained, in which inconsistency in the in-plane brightness distribution of the liquid crystal display is small.

In the above example, a surface light source has higher brightness in a center portion. However may the brightness distribution be in the surface light source, the same effect can be obtained through the offsetting achieved by controlling the transmittance distribution of the liquid crystal display element. The term relative brightness distribution used herein is a value obtained by dividing a maximum brightness value in the display area by a minimum brightness value therein. Likewise, the term relative transmittance distribution is a value obtained by dividing a maximum transmittance value in the display area by a minimum transmittance value therein.

Further, since the brightness distribution inconsistency is more easily recognized in a half-tone range, controlling the brightness distribution in the half-tone range is more effective. The half-tone range as referred to herein is primarily a range of 10 to 60% in the relative transmittance.

Further, the transmittance of the liquid crystal display element may not necessarily distribute so as to totally offset the brightness distribution inconsistency of the surface light source, but should distribute so as to lower the inconsistency in the relative brightness distribution of the liquid crystal display than the inconsistency in the relative brightness distribution of the surface light source, and desirably to reduce by not smaller than 10%, or reduce the relative brightness distribution inconsistency of the liquid crystal display within a range of about 20%.

Description will be made for a double refraction (birefringence) mode which is a typical liquid crystal display mode as in the IPS (in-plane switching) method.

First an operation principle will be described, using an example of the IPS method which has been attracting attention for its superior (wider) view angle. The description will only cover for a liquid crystal structure having a positive dielectric anisotropy. However, the same display can be performed also in a crystal structure having a negative dielectric anisotropy, by swapping directions of a major axis and a minor axis.

FIG. 3 shows a display principle of an in-plane switching liquid crystal display. In this figure, a member indicated by numeral 5 is an electrode substrate, a member indicated by numeral 6 is an counter substrate, a member indicated by numeral 7 is a pixel electrode, a member indicated by numeral 8 is a common electrode, and a member indicated by numeral 9 is a liquid crystal molecule. Members indicated by numerals 10, 11 are polarizers respectively, and members indicated by numerals 12, 13 are transmitting axis's of the polarizers 12, 13 respectively. Indicated by numeral 14 is a direction of the liquid crystal molecule major axis when there is no electric field. Indicated by numeral 15 is incoming light, indicated by numeral 16 is a direction of the electric field, indicated by numeral 17 is oval polarized light, and indicated by numeral 18 is transmitted light. The polarizer 10 is disposed so that its transmitting axis is in parallel to the liquid crystal molecule major axis direction 14, whereas the polarizer 11 is disposed so that its transmitting axis is vertical to the transmitting axis 12 of the polarizer 10. Here, a liquid crystal layer thickness (cell gap) is represented by d.

Figure 3A:
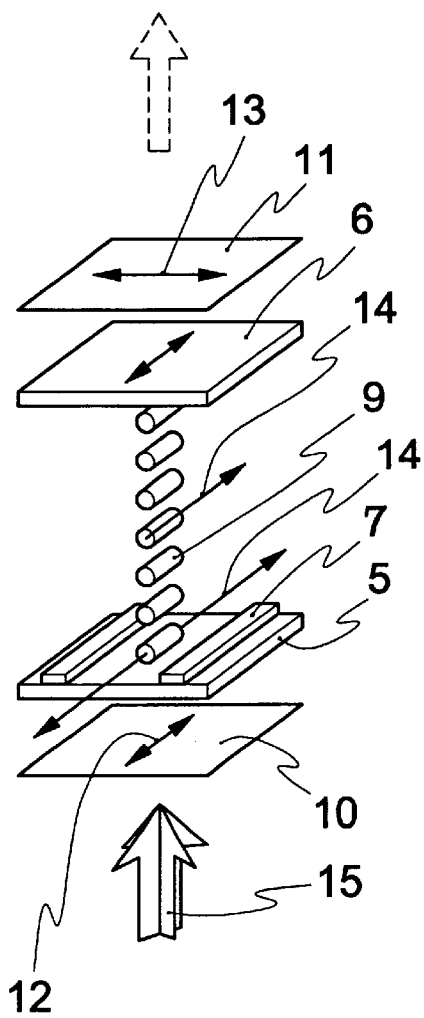
FIGS. 3(a) and 3(b) are perspective views showing a principle for the in-plane switching liquid crystal display device.

When the electric voltage is turned OFF (FIG. 3(a)), the incoming light 15 passes through the polarizer 10, becomes incoming straight polarized light, but is not double-refracted when passing the liquid crystal cell, and therefore cannot pass the polarizer 11, creating a dark state.

Figure 3B:
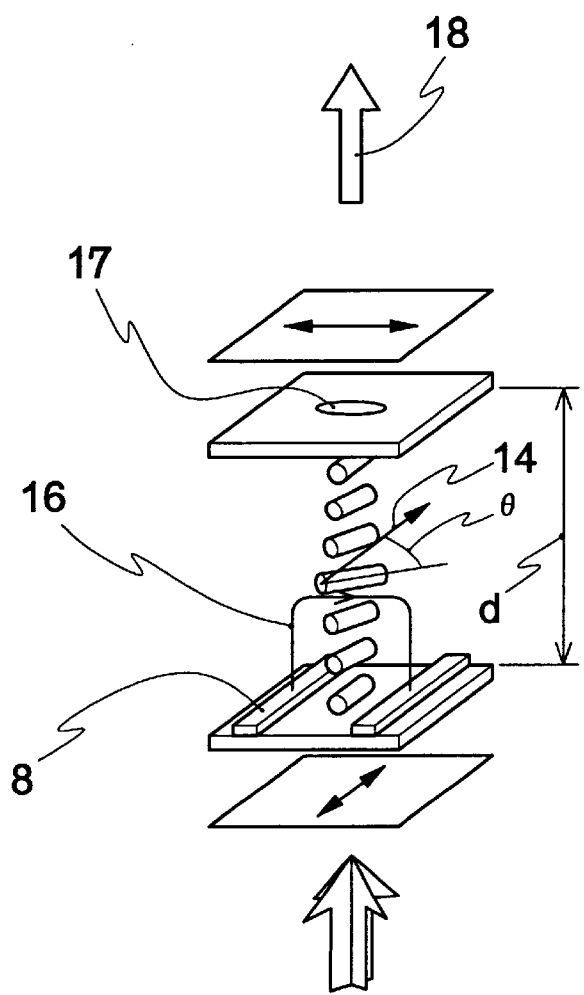

When the voltage is turned ON (FIG. 3(b)), the liquid crystal molecule 9 rotates toward the electric field 16 while maintaining the parallelism to the substrates 5, 6. This allows the incoming straight polarized light to be double-refracted to become an oval polarized light, allowing an amount of the transmitted light 18 to pass in accordance with a rotating angle (θ) of the liquid crystal molecule. Here, θ can be expressed as a function of an electric voltage applied (V). By turning the electric voltage on and off, display state of dark and bright can be achieved.

Intensity I of the transmitted light at this time can be given by Expression (1):

$$I = Io\ \sin^2(\pi \Delta n d/\lambda)\sin^2(2\theta(V)) \tag{1}$$

where Io represent intensity of light coming in the polarizer 10, λ representing wavelength, and Δn representing anisotropy of refractive index which is an absolute value ($|n_o - n_e|$) as difference between normal light refractive index $n_0$ and extraordinary light refractive index $n_e$.

As will be understood from Expression (1), the transmitting intensity of the light transmitted out of the polarizer 11 is determined by two terms which can be classified into; a term influenced by relationship between the incoming light wavelength λ and Δnd, and another term expressing liquid crystal molecule response to the electric voltage.

Here, voltage—transmittance curve of the in-plane switching liquid crystal display varies depending on the liquid crystal thickness, i.e. the cell gap d, as discussed in Presentation number 3A14 on Page 307 of "Liquid Crystal Discussion Preliminary Papers, 1996" (sponsored by the Japan Chemical Association).

Figure 4:
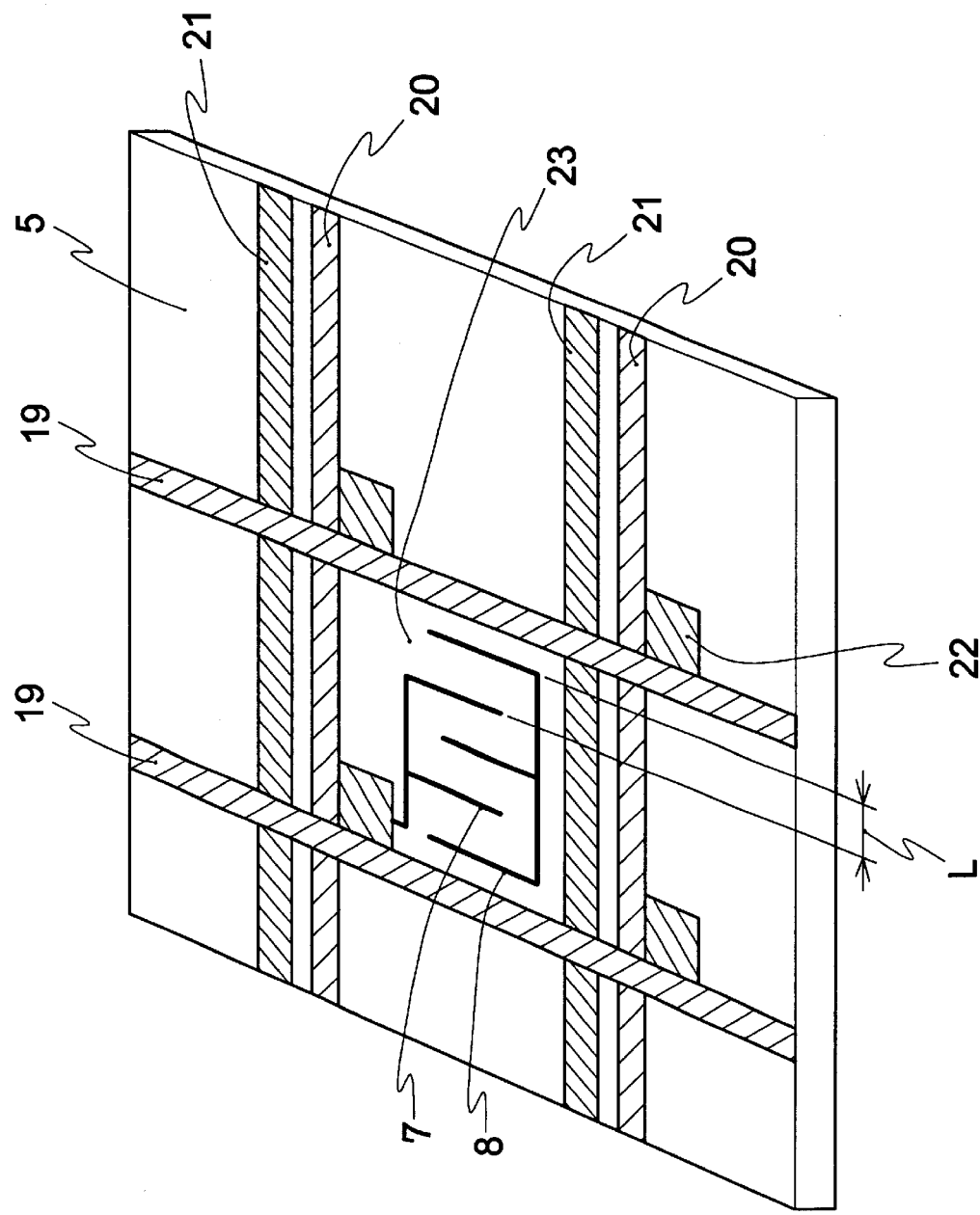
FIG. 4 is a perspective view showing a construction of an array substrate.

Next, description will cover a TFT array substrate with reference to FIG. 4. In the figure, a member indicated by numeral 5 is electrode substrate, a member indicated by numeral 7 is pixel electrode, and a member indicated by numeral 8 is a common electrode. Indicated by numeral 19 is an image signal line, and indicated by numeral 22 is a switching device such as a thin film transistor (TFT). The array substrate 5 has a surface formed with the image signal line 19, a scanning signal line 20, a common signal line 21, the TFT 22 and a pixel portion 23. Further, the pixel portion includes the pixel electrode 7 and the common electrode 8 formed in parallel to the pixel electrode at a predetermined interval. The pixel electrode 7 is supplied with an electric voltage by the TFT 22. The common electrode 8 is supplied an electric voltage by the common signal line 21.

With the above arrangement, electric voltage applied between the pixel electrode and the common electrode is the same at any place. The interval between the pixel electrode and the common electrode is designated as an inter-electrode gap L.

As shown in the Presentation number 3A14 on Page 307 of the "Liquid Crystal Discussion Preliminary Papers, 1996" for example, a threshold voltage of the in-plane switching liquid crystal display is given by Expression (2):

$$Vc = Ec \times L = \pi(L/d)(K2/\in o/|\Delta \in|)^{1/2} \quad (2)$$

where Vc represents the threshold voltage, Ec represents a threshold electric field, $K_2$ represents twisting elasticity constant of the liquid crystal, $\in o$ represents dielectric constant, and $\Delta \in$ represents dielectric constant anisotropy of the liquid crystal. As shown above, the threshold voltage has a proportional relationship to the inter-electrode gap L and a reverse proportional relationship to the cell gap d since the response of the liquid crystal is made with respect to the electric field.

From the above results, it is understood that in the in-plane switching liquid crystal display, the panel transmittance with respect to the applied voltage varies depending on the cell gap d and the inter-electrode gap L.

Operation principle in the TN mode will be described now, using an example of normally white mode (NW mode). In the TN mode, the liquid crystal molecule is twisted by 90 degrees between the two substrates. The polarizer on the incoming side is disposed so that its transmitting axis is in any one of parallel and vertical to the orienting direction of the liquid crystal, whereas the polarizer on the outgoing side is disposed so that its transmitting axis is vertical to that of the polarizer on the incoming side.

Under no electric voltage applied, the incoming light passes the polarizer, becomes straight polarized light, and is rotated due to rotatory polarization of the liquid crystal, passing the polarizer on the outgoing side to create a bright state. The transmittance at this time is given by Expression (3), (Reference; page 16, "The Liquid Crystal (Volume for Application)", published by Baifukan):

$$T = (½)[1 - \sin^2\{(\pi/2) \times (1+U^2)^{1/2}\}/(1+U^2)]$$

$$U = 2 \times \Delta nd/\lambda \quad (3),$$

where T represents the transmittance.

In the present invention, λ is preferably 543.5 nm, where any human being can sensitively perceive.

As shown above, the transmittance T is influenced by the cell gap d.

As shown in the above, the transmittance in the liquid crystal display element varies depending on the cell gap and its electrode construction, regardless of the display mode. For this reason, in-plane distribution of the relative transmittance can be controlled by varying the cell gap or electrode construction of the liquid crystal display.

FIG. 14 shows relationship between the electric voltage applied and the transmittance, using the liquid crystal layer thickness as a parameter. The figure includes a curve I showing a case in TN mode with the liquid crystal thickness of 4.5 μm, a curve J with the liquid crystal thickness of 5 μm, and a curve K showing a case in IPS mode with the liquid crystal thickness of 4 μm, a curve L with the liquid crystal thickness of 3.6 μm. As shown in the figure, there is a range of condition in which the transmittance increases with increase in the liquid crystal thickness, in both of the TN mode and IPS mode. In the IPS mode, the transmittance can also be varied by varying electric field intensity caused by variation in the inter-electrode gap. The present invention makes use of such a condition range as above, makes variation in the transmittance within a displaying plane of the liquid crystal display element (liquid crystal cell), using the difference in the transmittance, for offsetting the brightness distribution inconsistency of the surface light source, thereby uniformalizing the brightness distribution in the displaying plane as the liquid crystal display as a whole.

Embodiment 1

An embodiment of the present invention will be described taking an example of a liquid crystal display which uses the in-plane switching mode (IPS mode).

EXAMPLE 1

Alignment film solution was applied to respective predetermined regions of a counter substrate and an electrode substrate by using a printing method, and was sintered to form alignment films. Thereafter, rubbing treatment was performed at an angle of 10 degrees to a direction of the comb teeth of the pixel electrode. The rubbing treatment was made so that the direction of rubbing in each of the counter substrate and the electrode substrate will be in parallel to each other when the substrates are faced to each other.

A TFT array substrate was applied with a sealing material in a predetermined pattern by a dispenser. The sealing material included MICRO ROD PF052: 5.2 μm glass spacer (manufactured by Nippon Electric Glass Co., Ltd.) by an amount of 2 wt %.

The counter substrate was applied with 3.38 μm-diameter MICRO PEARL SP 20338 (manufactured by Sekisui Fine Chemical Corporation) at a spray density of about 300 grainss/mm².

The electrode substrate and the counter substrate were faced to each other in a predetermined alignment of pixels, and then heated and pressed to bind the electrode substrate and the counter substrate with each other.

Panel cutting, in which the above pair of substrates was cut into a predetermined size, was made. Then liquid crystal having a refraction anisotropy of 0.079 and dielectric anisotropy of 10.4 was injected to form a liquid crystal display element. The liquid crystal layer was found to have a smallest thickness of 3.6 μm in a center region of a display screen. The thickness of the liquid crystal layer near a sealed perimeter region was thicker than in the center region by about 0.2 μm. This thickness difference is represented by Δd.

Figure 5:
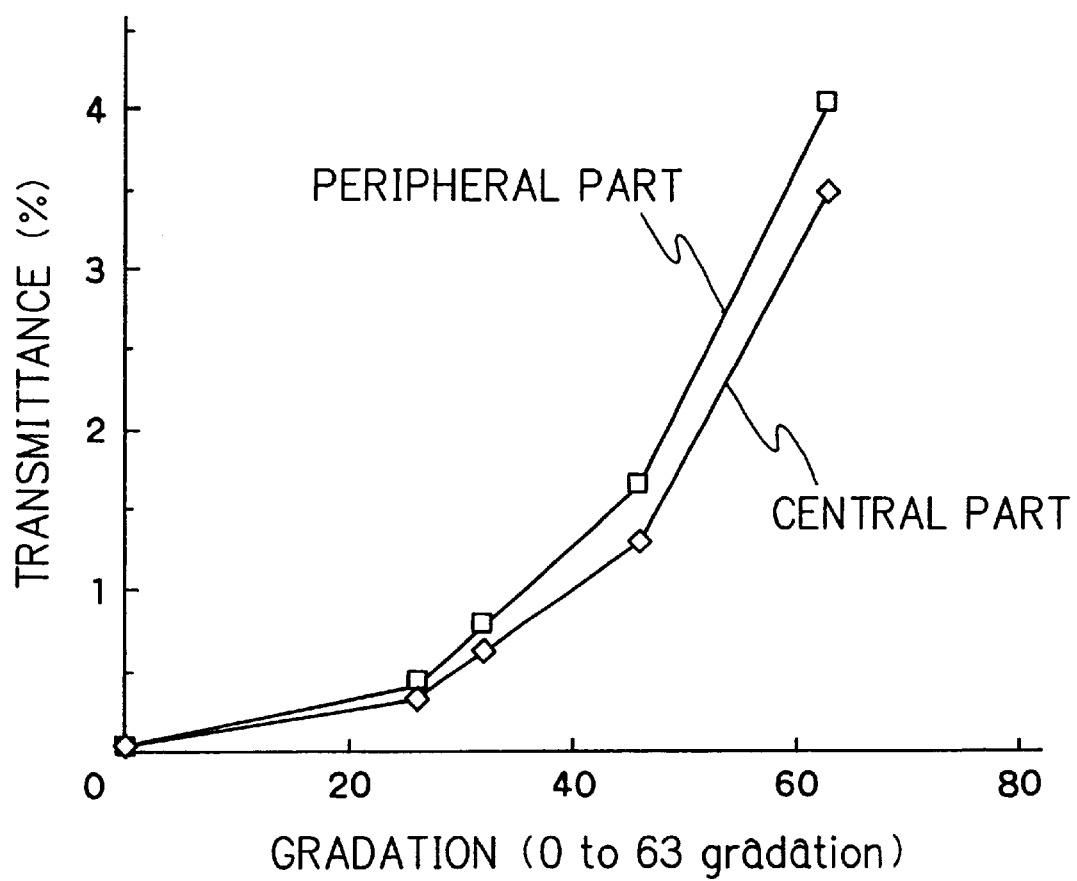
FIG. 5 is a graph showing a relation between transmittance and gradation of the liquid crystal display device of the present invention.
Figure 6:
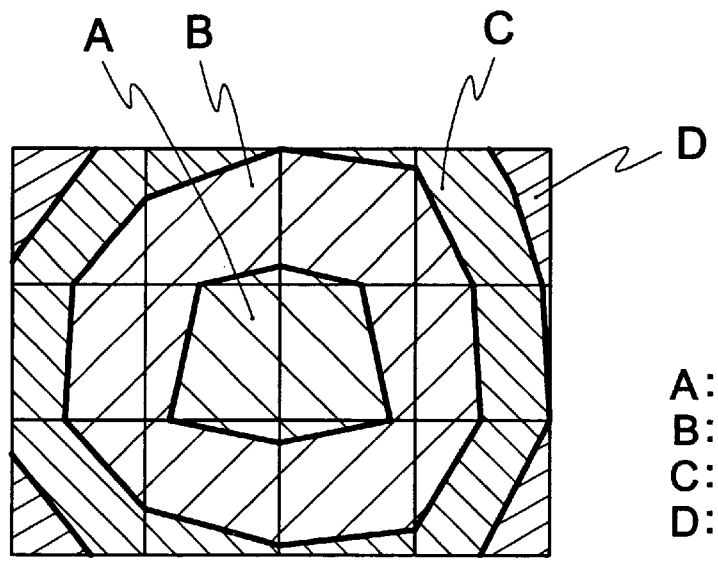
FIG. 6 is a graph showing a distribution of an in-plane relative brightness in a surface light source of the liquid crystal display device of the present invention.
Figure 7:
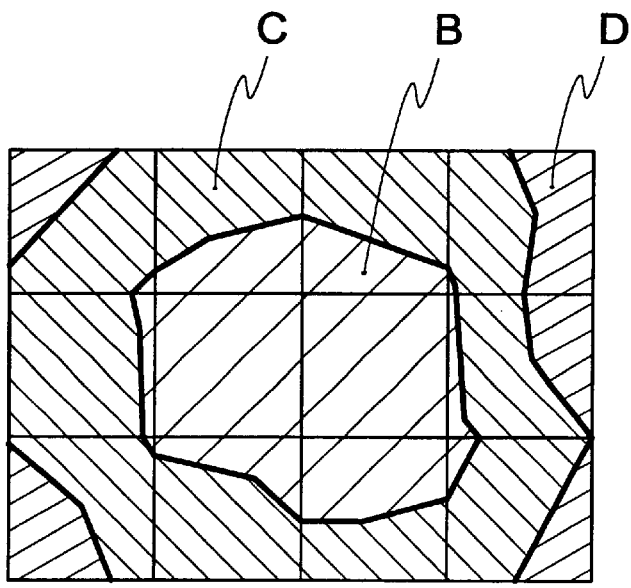
FIG. 7 is a graph showing a distribution of an in-plane relative brightness at white display of the liquid crystal display device of the present invention.
Figure 8:
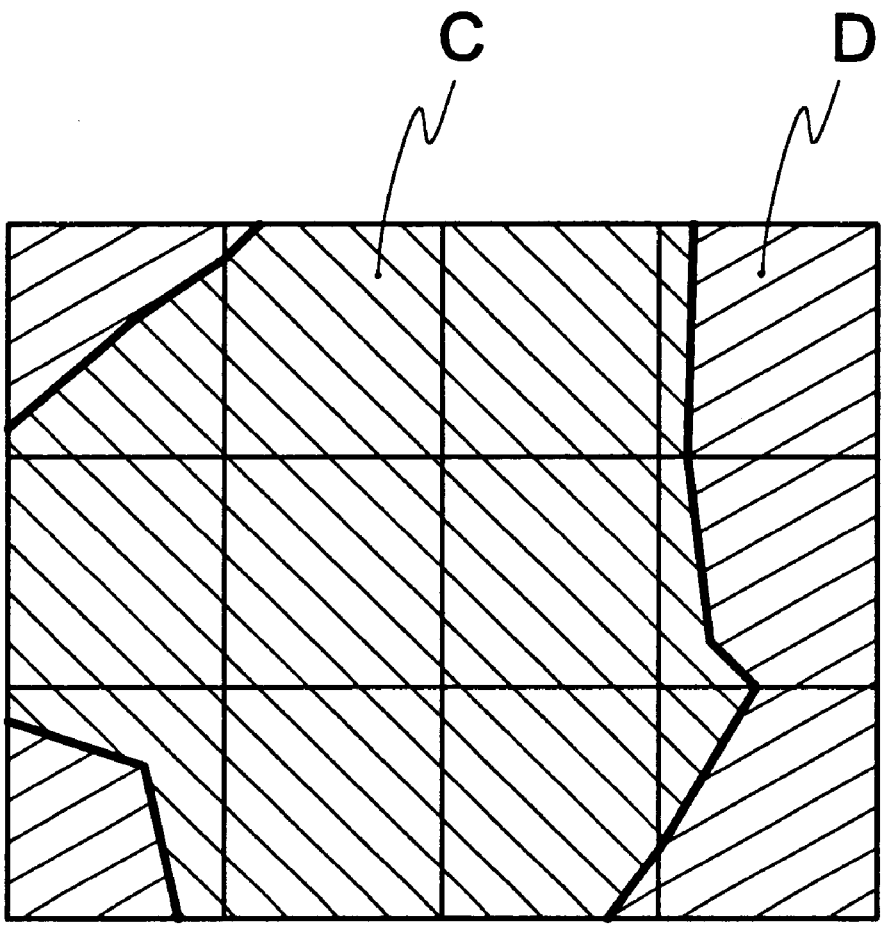
FIG. 8 is a graph showing a distribution of an in-plane relative brightness at half tone of the liquid crystal display device of the present invention.

Gradation—transmittance curves of the center region and of the perimeter region are given in FIG. 5. It is shown that the perimeter region has a higher transmittance for a gradation level being equal. This liquid crystal display element was combined with a surface light source having a relative brightness distribution as shown in FIG. 6 to form a liquid crystal display. In FIGS. 6, 7 and 8, alphabetical code A to D indicates ranges of relative brightness values. Specifically, code A indicates a range of 1.60 to 1.80, code B indicating a range of 1.40 to 1.60, code C indicating a range of 1.20 to 1.40, and code D indicating a range of 1.00 to 1.20. A maximum relative brightness value (Max. value/Min. value) was about 1.66. Further, a maximum electric voltage applied to the liquid crystal display element was 6 V. FIG. 7 shows an in-plane brightness distribution of the liquid crystal display in a white-display state. FIG. 8 shows an in-plane brightness distribution in a half-tone display state (30/63 grades), i.e. at the relative transmittance of 20%. The maximum relative brightness value was about 1.47 in the white display state (63/63 grades), and about 1.27 in the half-tone display state. As exemplified in the above, the in-plane brightness distribution consistency was improved, and bright inconsistency was no longer conscious in the half-tone display state. The liquid crystal display which is superior to the prior art was obtained.

EXAMPLE 2

A liquid crystal display was manufactured in the same method as in Example 1. Micro Rod having a diameter of 5.0 μm was mixed into the sealing material.

As a result, the in-plane brightness distribution was improved, and bright inconsistency was no longer conscious in the half-tone display state. The liquid crystal display which is superior to the prior art was obtained.

EXAMPLE 3

A liquid crystal display was manufactured in the same method as in Example 1. Micro Rod having a diameter of 5.1 μm was mixed into the sealing material.

As a result, the in-plane brightness distribution was improved, and bright inconsistency was no longer confirmed in the half-tone display state. The liquid crystal display which is superior to the prior art was obtained.

EXAMPLE 4

A liquid crystal display was manufactured in the same method as in Example 1. Micro Rod having a diameter of 5.4 μm was mixed into the sealing material.

As a result, the in-plane brightness distribution was improved, and bright inconsistency was no longer confirmed in the half-tone display state. The liquid crystal display which is superior to the prior art was obtained.

Conditions not mentioned for Examples 2, 3 and 4 were all the same as in Example 1.

Table 1 summarizes improvement in the relative brightness distribution and display characteristics of the liquid crystal displays used in Examples 1 through 4. As will be understood from Table 1, improvement was achieved in each of the examples within a Δd range of 0.05 to 0.4. There is a tendency that a larger Δd renders greater improvement. However, Δd has an upper limit for achieving optical function of the liquid crystal layer. Thus, a preferable range for the Δd is 0.05 to 1 μm.

TABLE 1

| Example | Δd | Distribution of relative brightness in the surface light source | Distribution of relative transmittance in the liquid crystal display element (30/63 grades) | Distribution of relative brightness in the liquid crystal display | Degree of improvement in the display characteristics |
|---|---|---|---|---|---|
| 1 | 0.2 | 1.66 | 1.3 | 1.27 | ○ |
| 2 | 0.05 | 1.66 | 1.08 | 1.56 | Δ |
| 3 | 0.1 | 1.66 | 1.22 | 1.37 | ○ |
| 4 | 0.4 | 1.66 | 1.48 | 1.18 | ○ |

Embodiment 2

As the counter substrate, a color filter having openings smallest in a center region of the display screen and gradually increasing toward the perimeter region, with a relative transmittance distribution of about 1.45 was used. Alignment film solution was applied to respective predetermined regions of a counter substrate and an electrode substrate by using a printing method, and was sintered to form alignment films. Thereafter, rubbing treatment was performed at an angle of 10 degrees to a direction of the comb teeth of the pixel electrode. The rubbing treatment was made so that the direction of rubbing in each of the counter substrate and the electrode substrate will be in parallel to each other when the substrates are faced to each other.

A TFT array substrate was applied with a sealing material in a predetermined pattern by a dispenser. The sealing material included MICRO ROD PF050: 5.0 μm glass spacer (manufactured by Nippon Electric Glass Co., Ltd.) by an amount of 2 wt %.

The counter substrate was applied with 3.38 μm-diameter spacer: MICRO PEARL SP 20338 (manufactured by Sekisui Fine Chemical Corporation) at a spray density of about 300 grainss/mm².

The electrode substrate and the counter substrate were faced to each other in a predetermined alignment of pixels, and then heated and pressed to bind the electrode substrate and the counter substrate with each other.

Panel cutting, in which the above pair of substrates was cut into a predetermined size, was made. Then liquid crystal having a refraction anisotropy of 0.079 and dielectric anisotropy of 10.4 was injected to obtain a liquid crystal display element. The liquid crystal layer was found to have a smallest thickness of 3.6 μm in a center region of a display screen.

This liquid crystal display element was combined with a surface light source having a similar relative brightness distribution (1.66) as used in Embodiment 1 to obtain a liquid crystal display. A maximum electric voltage applied to the liquid crystal display element was 6.5 V.

As a result, the in-plane relative brightness distribution of the liquid crystal display was improved to 1.2, which is better than the relative brightness distribution in the surface light source. The display characteristic which is superior to the prior art was obtained.

Embodiment 3

As the counter substrate, a color filter having openings smallest in a center region of the display screen and gradually increasing toward the perimeter region, with a relative transmittance distribution of about 1.15 was used. Using this particular counter substrate and the electrode substrate, a liquid crystal display was manufactured in the same method as in Embodiment 2. During the manufacturing steps the transmittance was adjusted by addition of carbon in order to provide color purity of color material from being altered. This liquid crystal display element was combined with a surface light source having a brightness highest in a center region of the display screen and gradually decreasing toward the perimeter region, with the relative transmittance distribution of about 1.3 to obtain a liquid crystal display. A maximum electric voltage applied to the liquid crystal display element was 6 V.

As a result, the in-plane brightness distribution of the liquid crystal display was improved to 1.25, which is better than the relative brightness distribution in the surface light source. The display characteristic which is superior to the prior art was obtained.

Embodiment 4

An electrode substrate having an opening ratio low in a center region and increasing toward the perimeter region, with the relative transmittance distribution of about 1.2 was used to manufacture a liquid crystal display element in the same method as in Embodiment 2. A liquid crystal display was manufactured by using this liquid crystal display element and the surface light source having a high brightness in a center region of the display screen as in the one used in Embodiment 1 and the relative brightness distribution of 1.4. The maximum electric voltage applied to the liquid crystal display element for this case was 6 V.

As a result, the in-plane relative brightness distribution of the liquid crystal display was improved to 1.25 which is superior to the relative brightness distribution in the surface light source, and brightness inconsistency was no longer recognized in the half-tone display state. The display characteristic which is superior to the prior art was obtained.

Embodiment 5

A liquid crystal display element was manufactured by using the same method as in Embodiment 2. A transmittance compensating film was applied to a viewer side of the liquid crystal display. The film was pasted by an adhesive having an adjusted refractive index so as to prevent reflection between the film and the liquid crystal display element. Transmittance distribution of the film is lowest in a center region and increases toward the perimeter region. The relative transmittance distribution was 1.28. A liquid crystal display was manufactured by using this particular liquid crystal display element and the surface light source having a high brightness in a center region of the display screen as in the one used in Embodiment 1 and the relative brightness distribution of 1.4. The in-plane relative brightness distribution of the liquid crystal display was improved to 1.16, which is superior to the relative brightness distribution in the surface light source, and brightness inconsistency was no longer recognized in the half-tone display state. The display characteristic which is superior to the prior art was obtained.

According to the present embodiment, the film is pasted to the viewer side of the liquid crystal display element. However, the same effect can be obtained if the pasting is made to the other side away from the viewer. Further, the same effect can be obtained if the film is provided not by means of pasting.

Further, the film may be replaced by another layer capable of controlling the transmittance, such as a glass substrate having a surface formed with a matrix of non-transparent metal.

Embodiment 6

Figure 9:
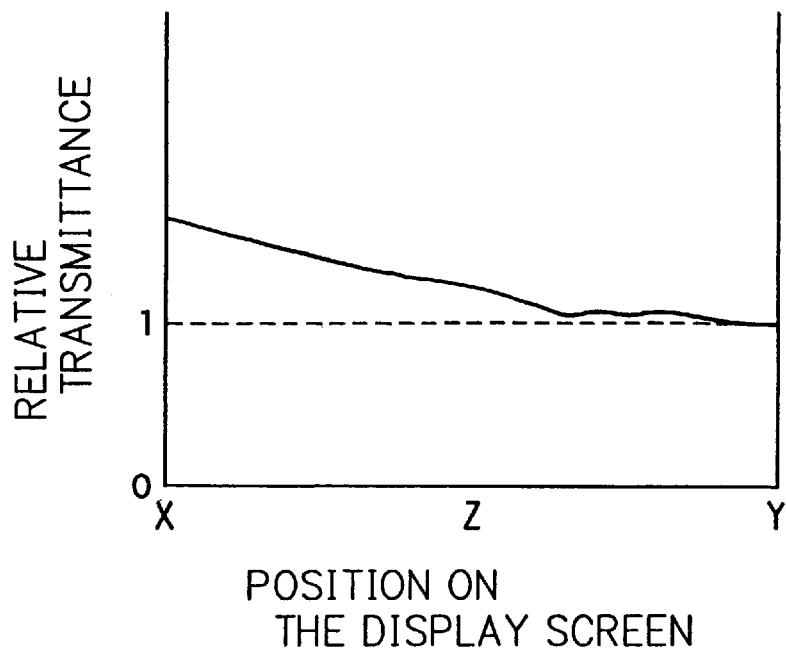
FIG. 9 is a graph showing a variation of in-plane transmittance in the transmittance correction film of the liquid crystal display device of the present invention.
Figure 10:
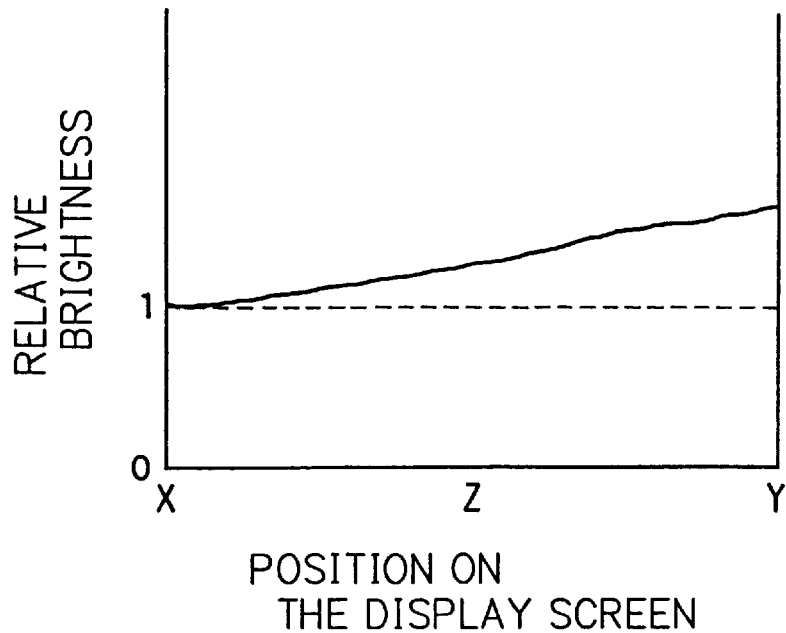
FIG. 10 is a graph showing a variation of in-plane brightness in the liquid crystal display device of the present invention.

A liquid crystal display element was manufactured by the same method as in Embodiment 2. A transmittance compensating film was applied to a viewer side of the liquid crystal display. The film was pasted by an adhesive having an adjusted refractive index so as to prevent reflection between the film and the liquid crystal display element. FIG. 9 shows variation in the relative transmittance distribution of the film along a line drawn from a left end (X) to right end (Y) passing a center portion (Z) of the display screen in parallel to a scanning line. With the above arrangement, the relative transmittance distribution was 1.2. A liquid crystal display was manufactured using a surface light source having an in-plane brightness distribution along a line passing the center portion in parallel to the scanning line varied as shown in FIG. 10, and the relative brightness distribution of 1.3. The in-plane relative brightness distribution in the liquid crystal display was improved to 1.08, which is superior to the relative brightness distribution in surface light source, and bright inconsistency was no longer recognized in the half-tone-display state. The display characteristic which is superior to the prior art was obtained.

According to the present embodiment, the film is pasted to the viewer's side of the liquid crystal display element. However, the same effect can be obtained even if the pasting is made to the other side away from the viewer. Further, the same effect can be obtained even if the film is provided not by means of pasting.

Embodiment 7

Figure 11:
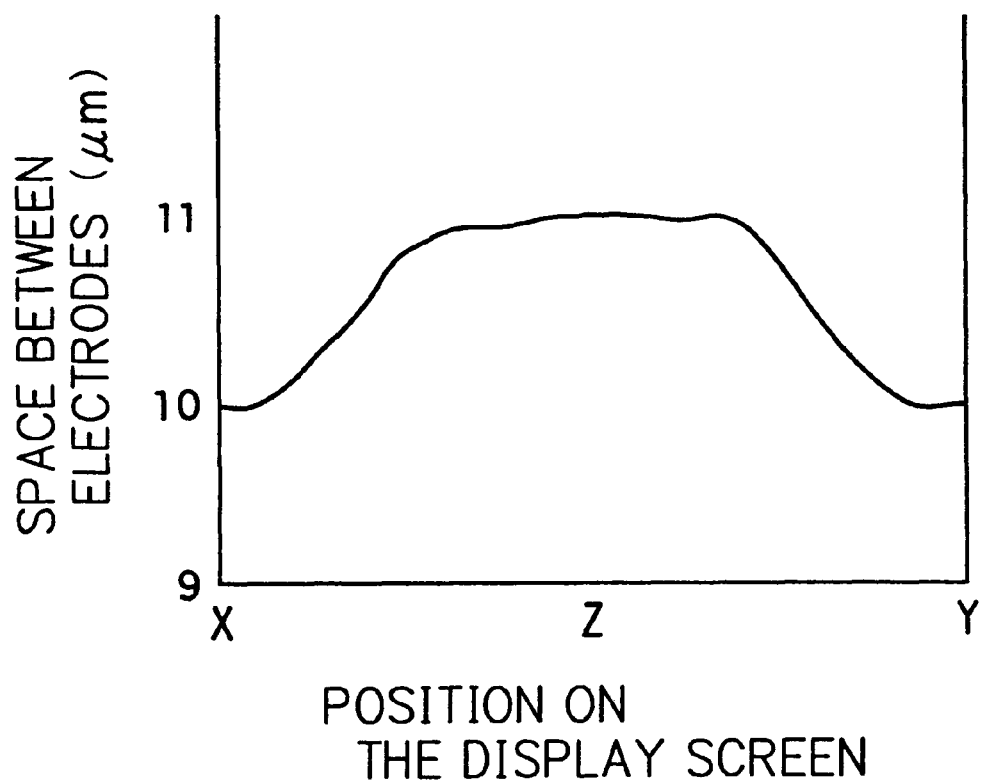
FIG. 11 is a graph showing an in-plane variation of the space between electrodes in the liquid crystal display device of the present invention.
Figure 12:
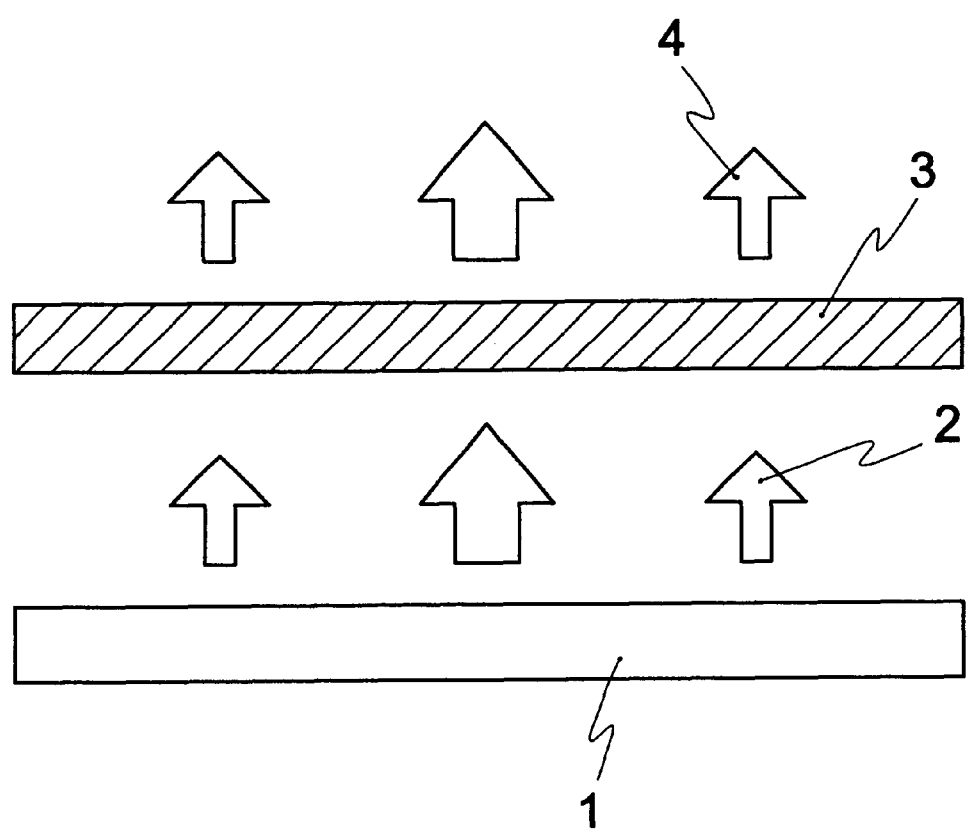
FIG. 12 is a sectional view illustrating a construction of the liquid crystal display device of the present invention.
Figure 13A:
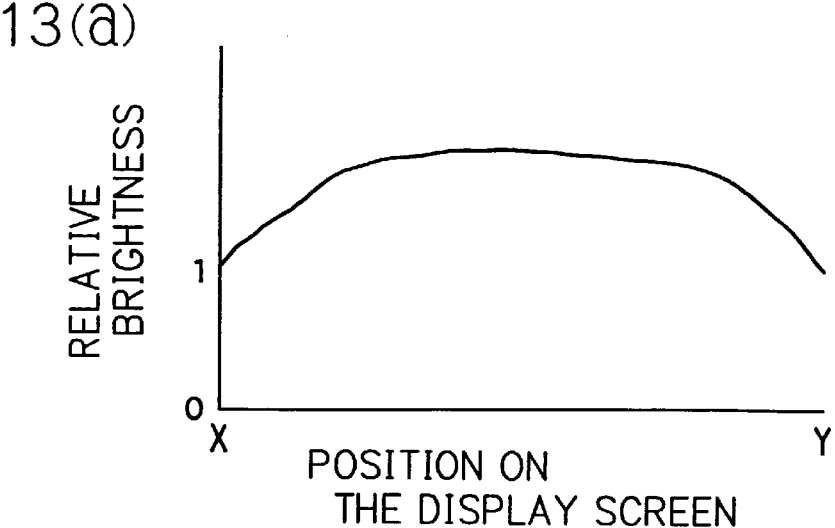
FIGS. 13(a), 13(b) and 13(c) are graphs respectively showing a relation between the relative transmittance in the scanning direction and position on the display screen, a relation between the transmittance of the liquid crystal element and position on the display screen and a relation between the relative brightness of the surface light source of the conventional liquid crystal display device.
Figure 13B:
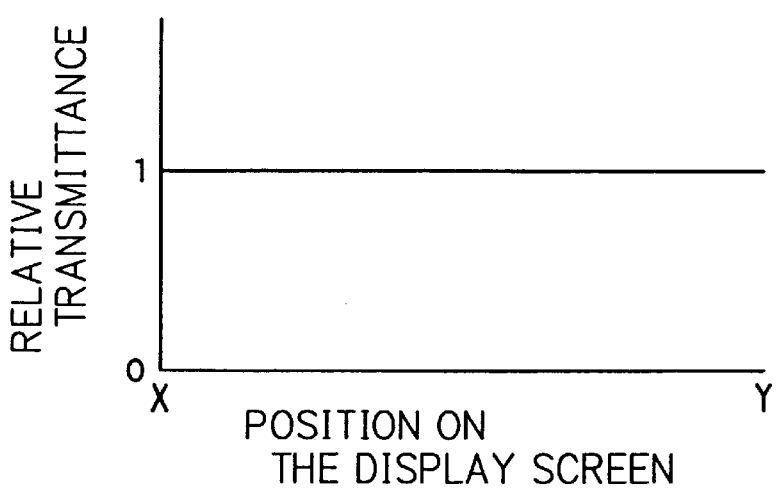
Figure 13C:
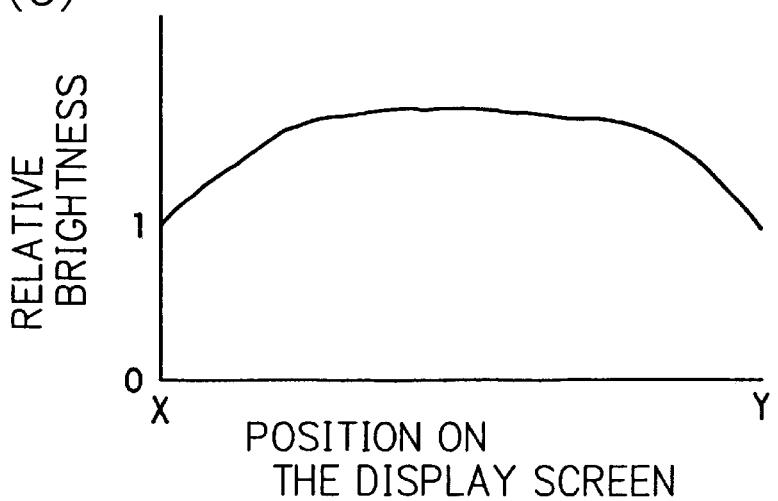

An electrode substrate having an inter-electrode gap L1 of 11 $\mu$m in a center region of the display area, an inter-electrode gap L2 of 10 $\mu$m in a 20 mm-band of the perimeter region, and an inter-electrode gap variation as shown in FIG. 11 along a line parallel to a scanning line passing the center of the display screen of this electrode substrate was used.

An alignment film layer was formed on the electrode substrate and rubbing treatment was performed according to the same method as used in Embodiment 1. Thereafter, adjustment was made to a diameter of a spacer in the sealing material and spacer in the plane in order to uniformalize the thickness of the liquid crystal layer. By performing a predetermined manufacturing process, a liquid crystal display element having a liquid crystal layer thickness of 3.6 $\mu$m was obtained.

As shown by a curve L in FIG. 14, the transmittance varies by the input voltage in the IPS mode. This voltage dependency corresponds to the voltage (electric field) dependency given by Expression (1). Under a given voltage applied, the transmittance can be varied by varying the inter-electrode gap thereby varying the electric field intensity. The curve L in FIG. 14 shows that a 10% change (0.5 V) in the applied voltage near 5 V voltage application level, i.e. in the half-tone range, causes 20% change in the transmittance. A 10% decrease in the inter-electrode gap causes 10% increase in the electric field intensity, which should bring a 20% increase in the transmittance. However, with an assumption that there is a 10% reduction in electrode opening ratio, there is left a 10% increase in the transmittance.

A liquid crystal display was manufactured by using the above liquid crystal display element and the surface light source used in Embodiment 1. The in-plane brightness distribution was improved in a half-tone display (of 40% transmittance). A display characteristic superior to the convention was obtained.

Embodiment 8

In this embodiment of the present invention, description will be made by taking an example of a liquid crystal display which uses the TN mode.

Alignment film solution was applied to respective predetermined regions of a counter substrate and an electrode substrate by using a printing method, and was sintered to form alignment film. Thereafter, rubbing treatment was performed at an angle of 45 degrees to the direction of major axis of the pixel electrode. The rubbing treatment was made so that the direction of rubbing in each of the counter substrate and the electrode substrate will be twisted at about 90 degrees to each other when the substrates are faced to each other.

A TFT array substrate was applied with a sealing material in a predetermined pattern by a dispenser. The sealing material included MICRO ROD PF067: 6.7 µm glass spacer (manufactured by Nippon Electric Glass Co., Ltd.) by an amount of 2 wt %.

The counter substrate was applied with 4.8 µm-diameter spacer: MICRO PEARL SP 2048 (manufactured by Sekisui Fine Chemical Corporation) at a spray density of about 300 grainss/mm$^2$.

The electrode substrate and the counter substrate were faced to each other in a predetermined alignment in pixels, and then heated and pressed to bind the electrode substrate and the counter substrate.

Panel cutting, in which the above pair of substrates was cut into a predetermined size, was made. Then liquid crystal having a refraction anisotropy of 0.087 and dielectric anisotropy of 7.6 was injected to obtain a liquid crystal display element. The liquid crystal layer was found to have a smallest thickness of 5 µm in a center region of the display screen. The thickness of the liquid crystal layer near a sealed perimeter region was thicker than in the center region by about 0.5 µm.

The relative transmittance distribution of this liquid crystal display element was about 1.20 in the half-tone display state (30/63 grades). A maximum electric voltage applied at this time was 4 V. This liquid crystal display element was combined with a surface light source used in embodiment 1 (relative brightness distribution: 1.66) into a liquid crystal display. The liquid crystal display showed an in-plane relative brightness distribution in a half-tone display state of 1.38. As a result, the in-plane brightness distribution was improved, and brightness inconsistency was no longer recognized in the half-tone display state. The liquid crystal display which is superior to the prior art was obtained.

In the normally-white TN mode, the transmittance of the liquid crystal display element is given by the expression (3), which achieves a maximum value when $U=(3)^{1/2}$. Under a condition in which the transmittance increases when the liquid crystal thickness is large as shown by curves I and J in FIG. 14, the relative brightness distribution inconsistency of the surface light source can be reduced by the following method. Specifically, with d1 being the liquid crystal thickness in the region of the highest brightness in the surface light source, and d2 being the liquid crystal thickness in the region of the lowest brightness, d1 is made smaller than d2, and d2 is made smaller than the liquid crystal thickness corresponding to the maximum transmittance given by the expression (3), i.e. $(3)^{1/2}\lambda/(2\Delta M)$.

According to the present invention, a liquid crystal display having a small in-plane brightness distribution inconsistency and superior display characteristic can be obtained by controlling the in-plane transmittance distribution of the liquid crystal display element in such a way as varying a panel construction, including the cell gap of the liquid crystal display element, opening rate, electrode construction.

What is claimed is:

1. A liquid crystal display comprising:
   an active matrix liquid crystal display element; and
   a surface light source;
   the liquid crystal display element including a liquid crystal substance sandwiched between an electrode substrate and an counter substrate via alignment films;
   the electrode substrate having a surface formed with a matrix of pixel portion having switching elements surrounded by a plurality of image signal lines and scanning signal lines;
   wherein with Xmax being a maximum brightness value in a display region of the surface light source, Xmin a minimum brightness value thereof, Zmax a maximum brightness value of the liquid crystal display, and Zmin a minimum brightness value thereof, an expression of $$X\mathrm{max}/X\mathrm{min} > Z\mathrm{max}/Z\mathrm{min}$$

is satisfied so that a transmittance distribution of the liquid crystal display element reduces a brightness distribution inconsistency in the surface light source.

2. The liquid crystal display of claim 1, wherein with Xmax being a maximum brightness value in a display region of the surface light source, Xmin a minimum brightness value thereof, Zmax a maximum brightness value of the liquid crystal display, and Zmin a minimum brightness value thereof, an expression of $$X\mathrm{max}/X\mathrm{min} - Z\mathrm{max}/Z\mathrm{min} > 0.1$$

is satisfied.

3. The liquid crystal display of claim 1, wherein with Δd being a difference between a maximum value and minimum value of a liquid crystal layer thickness, the expression $$0.05\ \mu\mathrm{m} \leq \Delta d \leq 1.0\ \mu\mathrm{m}$$

is satisfied.

4. The liquid crystal display of claim 3, wherein with an orientation direction of the liquid crystal near the electrode substrate differs by 90 degrees from an orientation direction of the liquid crystal near the counter substrate, the electrode substrate and the counter substrate being placed between two polarizers, the polarizers on the electrode substrate side and the counter substrate side having an absorption axis in a direction equal to or differing by 90 degrees from the orienting direction of the liquid crystal; and wherein d1 is the liquid crystal thickness corresponding to a region of the highest brightness in the surface light source, d2 is the liquid crystal thickness in a region of the lowest brightness thereof, Δn is a refraction anisotropy of the liquid crystal, and λ being a wavelength, the expressions of $$d1 < d2$$

and $$d2 < (3)^{1/2}\lambda/(2\Delta n)$$

are satisfied.

5. The liquid crystal display of claim 3, wherein a liquid crystal display element has a comb-like shaped electrode; wherein d1 is liquid crystal thickness corresponding to a region of the highest brightness in the surface light source, d2 is liquid crystal thickness in a region of the lowest brightness thereof, a maximum electric voltage applied to the liquid crystal layer is lower than an electric voltage for achieving the maximum transmittance when the liquid crystal thickness is d2, and the expression $$d1 < d2$$

is satisfied.

6. The liquid crystal display of claim 1, wherein the brightness value at a center portion of the surface light source is highest, with the brightness value decreasing toward a perimeter region.

7. The liquid crystal display of claim 1, wherein the transmittance distribution of the liquid crystal display element is determined by a transmittance of the counter substrate.

8. The liquid crystal display of claim 7, wherein the transmittance of the counter substrate is determined by an opening ratio of the counter substrate.

9. The liquid crystal display of claim 7, wherein the counter substrate has a surface formed with a color layer for color display, the transmittance of the counter substrate is determined by the color layer.

10. The liquid crystal display of claim 9, wherein the counter substrate has the surface formed with the color layer for color display, the transmittance of the color layer is controlled by mixing non-transparent particles like carbon into the color layer.

11. The liquid crystal display of claim 1, wherein the liquid crystal display element has a transmittance distribution determined by an opening ratio of the electrode substrate.

12. The liquid crystal display of claim 1, wherein a layer controlling the transmittance is provided on a viewer's side or on a side away therefrom, for controlling the transmittance of the liquid crystal display element.

13. The liquid crystal display of claim 1, wherein the electrode substrate has an electrode construction for generation of an electric field generally in parallel to the substrates.

14. A liquid crystal display of claim 1, the electrode having a comb-like construction, the electric field generally parallel to the substrates being generated for in-plane drive of the liquid crystal molecules;

wherein with L1 being an inter-electrode gap of the comb-like shaped electrode corresponding to a region of the highest brightness of the surface light source, L2 being an inter-electrode gap of the comb-like shaped electrode corresponding to a region of the lowest brightness thereof;

an expression of $$L1 > L2$$

is satisfied.

* * * * *